United States Patent
Yoshioka et al.

(10) Patent No.: US 10,309,530 B2
(45) Date of Patent: Jun. 4, 2019

(54) AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Yuhei Yoshioka, Anjo (JP); Yasushi Sato, Anjo (JP); Toshihiko Kamiya, Toyota (JP); Akio Murasugi, Toyota (JP); Masahide Ichikawa, Nagakute (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 15/517,790

(22) PCT Filed: Nov. 9, 2015

(86) PCT No.: PCT/JP2015/081450
§ 371 (c)(1),
(2) Date: Apr. 7, 2017

(87) PCT Pub. No.: WO2016/084588
PCT Pub. Date: Jun. 2, 2016

(65) Prior Publication Data
US 2017/0305268 A1 Oct. 26, 2017

(30) Foreign Application Priority Data
Nov. 28, 2014 (JP) .................. 2014-241020

(51) Int. Cl.
*F16H 59/40* (2006.01)
*F16H 59/42* (2006.01)
(Continued)

(52) U.S. Cl.
CPC ............ *F16H 61/38* (2013.01); *F16H 39/42* (2013.01); *F16H 61/0021* (2013.01);
(Continued)

(58) Field of Classification Search
CPC ....... B60K 17/105; F16H 39/42; F16H 41/30; F16H 59/14; F16H 59/40; F16H 59/42;
(Continued)

(56) References Cited

U.S. PATENT DOCUMENTS

2011/0073427 A1  3/2011  Ishikawa et al.
2011/0247443 A1* 10/2011  Shimizu .............. F16H 61/0021
                                          74/473.11
2014/0302965 A1  10/2014  Horiike et al.

FOREIGN PATENT DOCUMENTS

JP  H11-236966 A  8/1999
JP  2007-113739 A  5/2007
(Continued)

OTHER PUBLICATIONS

Feb. 9, 2016 International Search Report issued in Patent Application No. PCT/JP2015/081450.

*Primary Examiner* — Jacob S. Scott
*Assistant Examiner* — Murad Jahmani
(74) *Attorney, Agent, or Firm* — Oliff PLC

(57) ABSTRACT

An automatic transmission where the control portion controls the adjustment solenoid valve so that the circulation hydraulic pressure equals to a second circulation hydraulic pressure higher than the first circulation hydraulic pressure when the rotational speed difference between the output rotational speed of the fluid transmission device and the rotational speed of the driving source is more than the predetermined rotational speed.

17 Claims, 5 Drawing Sheets

(51) Int. Cl.
*F16H 59/46* (2006.01)
*F16H 59/74* (2006.01)
*F16H 61/12* (2010.01)
*F16H 61/14* (2006.01)
*F16H 61/38* (2006.01)
*F16H 61/64* (2006.01)
*F16H 39/42* (2006.01)
*F16H 61/02* (2006.01)
*F16H 61/00* (2006.01)
*F16H 59/14* (2006.01)
*F16H 61/36* (2006.01)
*F16H 59/36* (2006.01)
*F16H 59/38* (2006.01)

(52) U.S. Cl.
CPC ..... *F16H 61/0267* (2013.01); *F16H 61/0276* (2013.01); *F16H 61/64* (2013.01); *F16H 59/46* (2013.01); *F16H 2059/366* (2013.01); *F16H 2059/385* (2013.01); *F16H 2061/124* (2013.01); *F16H 2061/1236* (2013.01); *F16H 2061/1252* (2013.01)

(58) Field of Classification Search
CPC .......... F16H 59/46; F16H 59/74; F16H 61/02; F16H 61/12; F16H 61/14; F16H 61/36; F16H 61/38; F16H 61/64; F16H 2061/1236; F16H 2061/124
See application file for complete search history.

(56) References Cited

FOREIGN PATENT DOCUMENTS

| | | |
|---|---|---|
| JP | 2008-164098 A | 7/2008 |
| JP | 2011-075061 A | 4/2011 |
| JP | 2014-202218 A | 10/2014 |
| JP | 2014-202317 A | 10/2014 |
| JP | 2015-014362 A | 1/2015 |

* cited by examiner

FIG. 4

| Nt \ Ne | 500[rpm] | 1000[rpm] | 1100[rpm] | 2100[rpm] |
|---|---|---|---|---|
| 200[rpm] | A [pa] | A [pa] | A+600[pa] | A+850[pa] |
| 1100[rpm] | A [pa] | A [pa] | A [pa] | A+550[pa] |
| 2000[rpm] | A [pa] | A [pa] | A [pa] | A [pa] |

AUTOMATIC TRANSMISSION

This technique relates to an automatic transmission to be mounted in a vehicle or the like and, more particularly, to an automatic transmission having a fluid transmission device for fluid-transmitting the rotation of a driving source via oil filled therein.

Some automatic transmissions to be mounted in a vehicle or the like have a fluid transmission device such as a torque converter that fluid-transmits the rotation of an engine using oil filled therein as working fluid. Since, in the state in which, for example, the vehicle is stopped by a brake while the engine idly rotates, the rotation of an input shaft of an automatic transmission mechanism (transmission) is forcibly stopped by the brake described above, the fluid transmission device absorbs the differential rotation between the rotation of the engine and the rotation of the input shaft of the automatic transmission mechanism and, when the brake is released after that, fluid-transmits the rotation of the engine to the input shaft of the automatic transmission mechanism to start the vehicle.

When, for example, the engine of a vehicle is stopped for a long period of time, an oil pump is also put in the stopped state for a long period of time. Accordingly, hydraulic pressure is not supplied and the oil in the automatic transmission gradually drops downward due to its own weight. Accordingly, oil having filled in a fluid transmission device such as a torque converter gradually leaks and air is put therein. After that, if an attempt is made to start the engine and move the vehicle, the fluid transmission device idly rotates and the driving force of the engine is not transmitted until the fluid transmission device is filled with oil (so-called lost phenomenon of the driving force) and the start of the vehicle is delayed, thereby providing a feeling of strangeness for the driver.

Accordingly, there is proposed a technique in which a check valve is provided in an oil path for collecting oil having leaked from the inside of the fluid transmission device to prevent the oil from leaking from the fluid transmission device even when the engine stopped state continues for a long period of time see JP-A-2007-113739). However, even when a check valve is provided as in JP-A-2007-113739, oil cannot be encapsulated completely. That is, even if an attempt is made to prevent a leak of oil using a mechanical structure, there is a limitation. That is, the disposition of check valves, sealing components, and the like in individual portions of the fluid transmission device only delays the time elapsed before oil leakage and prolongs the service life, but does not prevent the lost phenomenon of the driving force as described above if the engine is stopped for a long period of time.

Accordingly, there is proposed a technique in which, when occurrence of a lost phenomenon (lost drive state) is determined, a vehicle is started by transmitting a torque while engaging a lock-up clutch (see JP-A-2014-202218).

SUMMARY

Although the technique in JP-A-2014-202218 described above resolves a lost phenomenon by the torque transmission of the lock-up clutch and enables the start of the vehicle, since the technique tries to engage the lock-up clutch in the state in which there is no oil or a little oil in the fluid transmission device, lubrication and cooling are insufficient, possibly affecting the durability. In addition, although the lock-up clutch needs to slip so as not to cause an engine stop during start, even when an attempt is made to control the slip state of the lock-up clutch using the differential pressure inside the fluid transmission device, sufficient controllability is not obtained because it is difficult to accurately grasp the amount of oil in the fluid transmission device, possibly causing an engagement shock during start of the vehicle.

An exemplary aspect of the disclosure provides an automatic transmission capable of preventing the lost phenomenon of a driving force from occurring when the engine starts after stopping for a long period of time without using a mechanical structure fir preventing oil leakage or using a lock-up clutch.

This automatic transmission includes a fluid transmission device fluid-transmitting rotation of a driving source via oil filled therein, a transmission mechanism changing an output rotational speed from the fluid transmission device and outputting a changed rotational speed, a hydraulic pressure control device including a circulation hydraulic pressure adjustment valve adjusting a hydraulic pressure discharged by an oil pump to a circulation hydraulic pressure circulating through the fluid transmission device and an adjustment solenoid valve supplying a signal pressure to the circulation hydraulic pressure adjustment valve, and a control portion that acquires a rotational speed of the driving source and that acquires an output rotational speed of the fluid transmission device, wherein the control portion controls the adjustment solenoid valve so that the circulation hydraulic pressure equals to a first circulation hydraulic pressure when a rotational speed difference between the output rotational speed of the fluid transmission device and the rotational speed of the driving source is equal to or less than a predetermined rotational speed and the control portion controls the adjustment solenoid valve so that the circulation hydraulic pressure equals to a second circulation hydraulic pressure higher than the first circulation hydraulic pressure when the rotational speed difference between the output rotational speed of the fluid transmission device and the rotational speed of the driving source is more than the predetermined rotational speed.

Since the fluid transmission device can be quickly filled with oil by increasing the circulation hydraulic pressure when oil in the fluid transmission device has leaked, the automatic transmission can prevent the lost phenomenon of a driving force from occurring during start after the driving source stops for a long period of time without using a mechanical stricture for preventing oil leakage or using a lock-up clutch.

BRIEF DESCRIPTION OF EMBODIMENTS

Various exemplary aspects of the disclosure will be described with reference to the drawings, wherein:

FIG. 4 illustrates an example of an instruction value map.

DESCRIPTION OF EMBODIMENTS

An embodiment will be described with reference to FIGS. 1 to 5. First, the schematic structure of an automatic transmission 3 and the schematic structure of a control device (referred to below as a control portion) 1 of the automatic transmission 3 will be described with reference to FIG. 1.

Figure 1:
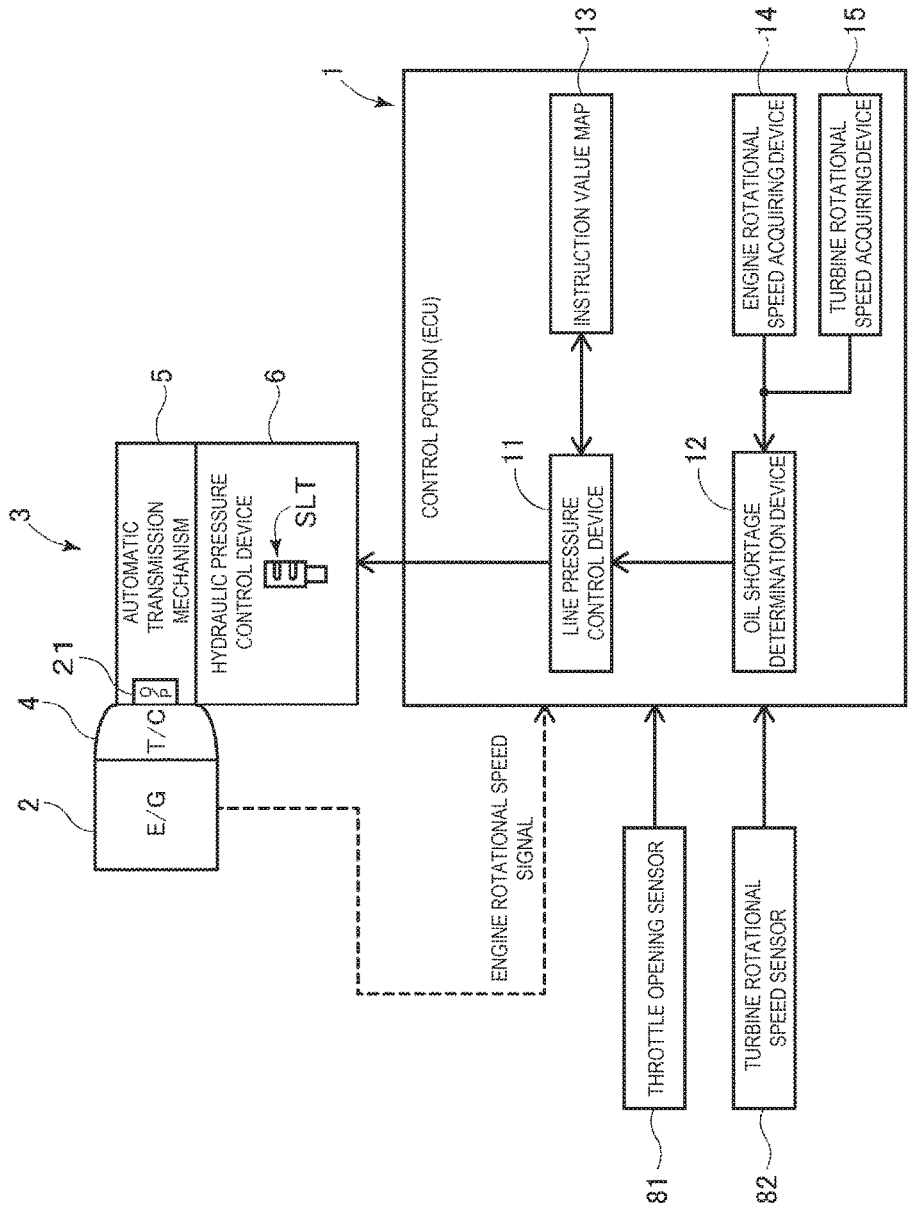
FIG. 1 is a block diagram illustrating an automatic transmission.

As illustrated in FIG. 1, the automatic transmission 3 includes a torque converter (fluid transmission device) 4 drivably coupled to an engine (driving source) 2, an automatic transmission mechanism (transmission mechanism) 5 changing the output rotational speed of the torque converter 4 and outputting the changed rotational speed to wheels (not illustrated), a hydraulic pressure control device 6 controlling, for example, the circulation hydraulic pressure of the torque converter 4, the working oil pressure supplied to the friction engagement elements (such as clutches and brakes) of the automatic transmission mechanism 5, and the lubricating hydraulic pressure for supplying a lubricant to the automatic transmission mechanism 5, and the control portion (ECU) 1, which will be described in detail later.

Figure 2:
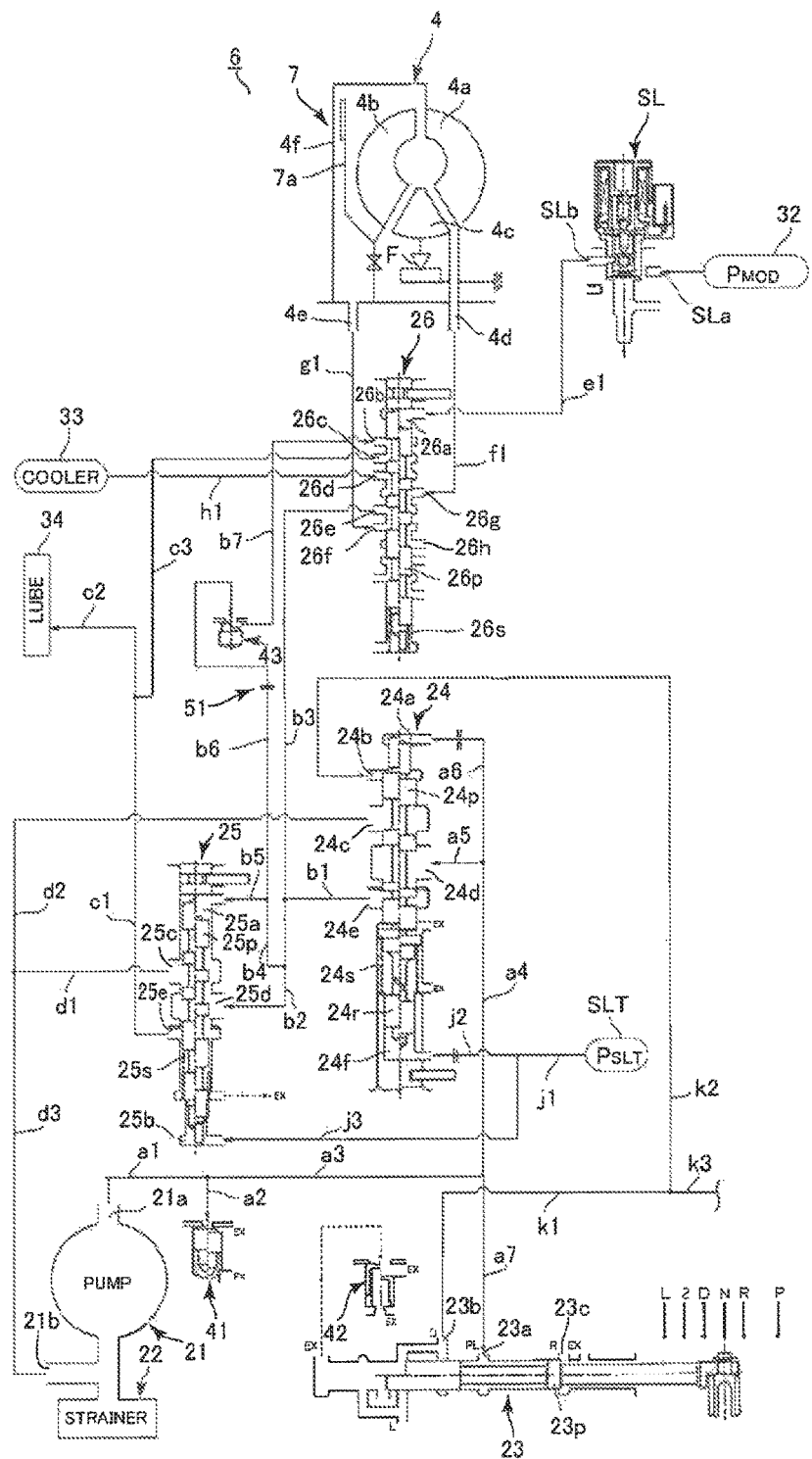
FIG. 2 is a hydraulic circuit diagram illustrating part of a hydraulic pressure control device of the automatic transmission.

As illustrated in FIG. 2, the torque converter 4 described above includes a pump impeller 4a drivably coupled to the engine 2, a turbine runner 4b to which the rotation of the pump impeller 4a is transmitted through working fluid (oil), and a stator 4c intervened by the pump impeller 4a and the turbine runner 4b and the reversed rotation is restricted by a one-way clutch F, and the turbine runner 4b is drivably coupled to the input shaft (not illustrated) of the automatic transmission mechanism 5 described above. In addition, the torque converter 4 is provided with a lock-up clutch 7 and, when the lock-up clutch 7 is engaged, the rotation of the engine 2 is transmitted to the input shaft of the automatic transmission mechanism 5 as is. In addition, the part (see FIG. 1) of the automatic transmission mechanism 5 close to the torque converter 4 is provided with an oil pump 21 drivably coupled to the engine 2 via the pump impeller 4a of the torque converter 4 and driven in sync with the engine 2.

The torque converter 4 configured as described above fluid-transmits the rotation of the engine 2 using the oil filled therein and transmits the driving force to the input shaft (not illustrated) of the automatic transmission mechanism 5. The automatic transmission mechanism 5 is, for example, of multi-stage type, changes the speed of rotation input to the input shaft by forming a transmission path having a different transmission shift ratio for each transmission shift stage depending on the engagement state of a plurality of friction engagement elements, and outputs a changed rotation to wheels via a differential device or the like. The automatic transmission mechanism 5 is not limited to the multi-stage type (stepped type) and may be a continuously variable type using a belt type continuously variable transmission apparatus, a toroidal continuously variable transmission apparatus, or the like.

As illustrated in FIG. 1, a throttle opening sensor 81 (or an accelerator opening sensor for detecting the opening of the accelerator) for detecting the opening of a slot valve (not illustrated), a turbine rotational speed sensor 82 for detecting the rotational speed (turbine rotation number Nt) of the turbine runner 4b (or the input shaft of the automatic transmission mechanism) described above, and the like are connected to the control portion (ECU) 1. In addition, the control portion 1 can receive a signal of the engine rotational speed (engine rotation number Ne) of the engine 2 from the engine 2 and the control portion 1 is connected so as to be capable of sending an instruction signal for controlling the hydraulic pressure of the above automatic transmission mechanism 5 to the hydraulic pressure control device 6. In addition, the control portion 1 includes a line pressure control device (circulation hydraulic pressure increasing device) 11, oil shortage determination device 12, an instruction value map 13, engine rotational speed acquiring device (driving source rotation acquiring portion) 14, and turbine rotational speed acquiring device (fluid transmission device rotation acquiring portion) 15, as various types of devices achieved by programs stored in a ROM or the like. The engine rotation number Ne may be detected by providing a sensor for detecting the rotational speed of the input members of the automatic transmission 3 or the pump impeller 4a.

The specific structure of the hydraulic pressure control device 6 will be described with reference to FIG. 2. As illustrated in FIG. 2, the hydraulic pressure control device 6 includes a strainer 22, the oil pump 21, a primary regulator valve 24, a secondary regulator valve 25, a manual shift valve 23, a solenoid valve SL, a lock-up relay valve 26, an oil cooler (COOLER) 33, a lubrication oil path (LUBE) 34, and the like.

Although the hydraulic pressure control device 6 includes various types of valves and oil paths for supplying hydraulic pressure to the hydraulic servos of the clutches and brakes of the transmission mechanism described above in addition to the portions illustrated in FIG. 2, descriptions of the valves and oil paths are omitted for simplicity.

Reference numeral SLT shown in FIG. 2 is an abbreviation of a linear solenoid valve (adjustment solenoid valve) SLIT for adjusting a line pressure $P_L$, and an SLT pressure $P_{SLT}$ adjusted by the linear solenoid valve SLT based on the throttle opening or the like is output. In addition, reference numeral 32 shown in FIG. 2 is an abbreviation of a modulator valve 32 and a modulator pressure $P_{MOD}$ obtained by adjusting the line pressure $P_L$ to a certain pressure using the modulator valve 32 is output.

The hydraulic pressure control device 6 has the oil pump 21 driven in sync with the rotation of the engine 2 and the oil pump 21 generates a hydraulic pressure by sucking up oil from an oil pan (not illustrated) via the strainer 22. The hydraulic pressure generated by the oil pump 21 described above is output to oil paths a1, a2, a3, a4, a5, a6, and a7 through an output port 21a and adjusted to the line pressure $P_L$, which will be described in detail later, by the primary regulator valve 24, which will be described in detail later.

The manual shift valve 23 includes a spool 23p driven in sync with a shift lever (not illustrated), an input port 23a to which the line pressure $P_L$ described later is input, a forward range pressure output port 23b that outputs the line pressure $P_L$ as a forward range pressure $P_D$ when the spool 23p is driven in the position of a forward range (D range, 2nd range, or L range), and a reverse range pressure output port 23c that outputs the line pressure $P_L$ as a reverse range pressure $P_R$ when the spool 23p is driven in the position of a reverse range (R range). For example, the reverse range pressure $P_R$ output from the reverse range pressure output port 23c in the R range is supplied, as the original pressure, to the hydraulic servo of a friction engagement element forming the reverse stage via an oil path omitted in FIG. 2 to form the reverse stage. In addition, for example, the forward range pressure $P_D$ output from the forward range pressure output port 23b in the D range is output to an oil chamber 24b of the primary regulator valve 24, which will be described later, via oil paths k1 and k2, supplied to linear solenoid valves (not illustrated) as the original pressure via an oil path ahead of an oil path k3 omitted in FIG. 2, and finally supplied to the hydraulic servos of the friction engagement elements forming the forward stages to form the forward stages.

In a neutral range (N range) or a parking range (P range), a check valve 42 is configured to close when the forward range pressure $P_D$ exhausted from a drain port EX of the manual shift valve 23 is equal to or less than a predetermined pressure to prevent air from entering the manual shift valve 23, the oil paths k1, k2, and k3, or the like.

The primary regulator valve (line pressure adjustment valve) 24 includes a spool 24$p$, a spring 24$s$ biasing the spool 24$p$ upward in the drawing, and a plug 24$r$ and includes an oil chamber 24$a$ above the spool 24$p$, an oil chamber 24$f$ below the plug 24$r$, the oil chamber 24$b$ formed due to a difference in a land diameters of the spool 24$p$, an discharge port 24$c$, a pressure adjustment port 24$d$, and a discharge pressure output port 24$e$. The SLT pressure $P_{SLT}$ is input from the linear solenoid valve SLT described above to the oil chamber 24$f$ described above via oil paths j1 and j2 and the line pressure $P_L$, which will be described later, is input to the oil chamber 24$a$ as a feedback pressure via the oil paths a5 and a6. In addition, as described above, the forward range pressure $P_D$ is input to the oil chamber 24$b$ via the oil paths k1 and k2 in the forward range.

The biasing force of the spring 24$s$ against the feedback pressure described above and the SLT pressure $P_{SLT}$ via the plug 24$r$ are applied to the spool 24$p$ of the primary regulator valve 24. That is, the position of the spool 24$p$ is controlled mainly by the magnitude of the SLT pressure $P_{SLT}$. When the spool 24$p$ is put in the state illustrated in the lower part in the drawing, the pressure adjustment port 24$d$ communicates with the discharge port 24$c$. When the spool 24$p$ is controlled to move to the state illustrated in the upper part in the drawing based on the SLT pressure $P_{SLT}$, an communication amount (throttle amount) between the pressure adjustment port 24$d$ and the discharge port 24$c$ is narrowed (blocked) and an communication amount (throttle amount) between the pressure adjustment port 24$d$ and the discharge pressure output port 24$e$ is narrowed (blocked). That is, the spool 24$p$ is controlled to move upward by the magnitude of the SLT pressure $P_{SLT}$ input to the oil chamber 24$f$ described above and the amount of hydraulic pressure exhausted by the discharge port 24$c$ is adjusted to adjust the hydraulic pressure of the pressure adjustment port 24$d$, thereby adjusting the hydraulic pressures of the oil paths a1, a2, a3, a4, a5, a6, and a7 as the line pressure $P_L$ that depends on the throttle opening. In the embodiment, an input torque input from the engine 2 to the automatic transmission 3 is calculated based on the speed ratio (Ne/Nt) of the engine rotation number Ne to the turbine rotation number Nt, the line pressure $P_L$ determined depending on the input torque is defined as a reference line pressure, and the line pressure increased by line pressure increase control, which will be described in detail later, is adjusted so as to become higher than the reference line pressure.

In addition, when the forward range pressure $P_D$ is input to the oil chamber 24$b$ described above in the forward range, the spool 24$p$ is biased downward. That is, a gain (input-output ratio) of the line pressure $P_L$ with respect to the SLT pressure $P_{SLT}$ is reduced. That is, since the necessary torque capacity of a clutch C-3 or a brake B-3 during reverse travel is large, the gain of the line pressure $P_L$ with respect to the SLT pressure $P_{SLT}$ needs to be increased. In contrast, during forward travel, even when the gain of the line pressure $P_L$ with respect to the SLT pressure $P_{SLT}$ is reduced, it is possible to obtain the line pressure Pl with a torque capacity enough to supply the hydraulic pressure to the hydraulic servos of a clutch C-1, a clutch C-2, and a brake B-1. That is, the line pressure $P_L$ output depending on the throttle opening can be reduced sufficiently, an unnecessary increase in the line pressure $P_L$, can be suppressed, and the fuel economy of a vehicle can be improved.

In addition, since the hydraulic pressure exhausted from the discharge port 24$e$ described above is returned to a port 21$b$ of the oil pump 21 via oil paths d2 and d3 and becomes the original pressure of the oil pump 21, the driving force required by the oil pump 21 is reduced consequently and unnecessary energy consumption is reduced, thereby contributing to the improvement of the fuel economy of the vehicle having the automatic transmission 3.

The line pressure $P_L$ described above is also supplied to the modulator valve 32 via an oil path (not illustrated) and the modulator valve 32 outputs the hydraulic pressure as is as the above modulator pressure $P_{MOD}$ when the line pressure $P_L$ is equal to or less than a predetermined pressure. When the line pressure $P_L$ is equal to or more than the predetermined pressure, the modulator valve 32 outputs a hydraulic pressure adjusted to a certain pressure as the modulator pressure $P_{MOD}$. In addition, a check valve 41 connected to the oil pump 21 via the oil path a2 is released when the line pressure $P_L$ becomes too high and, when the line pressure $P_L$ is equal to or higher than a predetermined pressure, and the check valve 41 drains the line pressure $P_L$ to protect the hydraulic pressure control device 6.

The secondary regulator valve (circulation hydraulic pressure adjustment valve) 25 includes a spool 25$p$ and a spring 25$s$ biasing the spool 25$p$ upward in the drawing and includes an oil chamber 25$a$ above the spool 25$p$, an oil chamber 25$b$, an discharge port 25$c$, a pressure adjustment port 25$d$, and an discharge pressure output port 25$e$ below the spool 25$p$. The SLT pressure $P_{SLT}$ is input from the linear solenoid valve SLT describe above to the oil chamber 25$b$ described above via the oil paths j1 and j3 and a secondary pressure $P_{SEC}$ is input to the oil chamber 25$a$ via oil paths b2, b4, and b5 as the feedback pressure.

The SLT pressure $P_{SLT}$ and the biasing force of the spring 25$s$ are applied to the spool 25$p$ of the secondary regulator valve 25 against the feedback pressure described above. That is, the position of the spool 25$p$ is controlled mainly by the magnitude of the SLT pressure $P_{SLT}$. When the spool 25$p$ is put in the state illustrated in the lower part in the drawing, the pressure adjustment port 25$d$ communicates with the discharge port 25$c$. When the spool 25$p$ is controlled to move to the state illustrated in the upper part in the drawing based on the SLT pressure $P_{SLT}$, an communication amount (throttle amount) between the pressure adjustment port 25$d$ and the discharge port 25$c$ is narrowed (blocked) and an communication amount (throttle amount) between the pressure adjustment port 25$d$ and the discharge pressure output port 25$e$ is opened. That is, the spool 25$p$ is controlled to move upward by the magnitude of the SLT pressure $P_{SLT}$ input to the oil chamber 25$f$ described above and the amount of hydraulic pressure exhausted by the discharge port 25$c$ is adjusted to adjust the hydraulic pressure of the pre sure adjustment port 25$d$, thereby adjusting the hydraulic pressures of the oil paths b1, b2, b3, b4, b5, b6, and b7 as the secondary pressure (circulation hydraulic pressure) $P_{SEC}$ that depends on the throttle opening.

When the oil pump 21 generates a hydraulic pressure in sync with the engine rotation number, the line pressure $P_L$ falls in the normal adjustment area, a discharge pressure of the line pressure $P_L$ is output from the primary regulator valve 24, the discharge pressure of the line pressure $P_L$ increases and the feedback pressure of the oil chamber 25$a$ of the secondary regulator valve 25 overcomes the biasing force of the spring 25s, and the state (secondary crack) in which the pressure adjustment port 25d starts communicating with the discharge pressure output port 25e is entered (that is, when the pressure becomes the normal adjustment area in which the secondary pressure $P_{SEC}$ is adjusted), the discharge pressure of the secondary pressure $P_{SEC}$ is output from the discharge pressure output port 25e. The discharge pressure of the secondary pressure $P_{SEC}$ is output to the lubrication oil path (LUBE) 34 communicating with the automatic transmission mechanism 5 via oil paths c1 and c2. That is, the discharge pressure becomes the lubrication pressure of the lubricant.

In addition, since the hydraulic pressure exhausted from the discharge port 25c described above is returned to the port 21b of the oil pump 21 via oil paths d1 and d3 and becomes the original pressure of the oil pump 21 as in the primary regulator valve 24 described above, the driving force required for the oil pump 21 is reduced consequently and unnecessary energy consumption is reduced, thereby contributing to the improvement of the fuel economy of the vehicle having the automatic transmission 3.

The solenoid valve SL (for example, normal close) has an input port SLa and an output port SLb and the modulator pressure $P_{MOD}$ adjusted by the modulator valve 32 described above is input to the input port SLa. In the solenoid valve SL, the input port SLa is disconnected from the output port SLb in the OFF state (non-energization state) and, when the ON state (energization state) is entered based on a signal from the control portion 1, the input port SLa communicates with the output port SLb, and the modulator pressure $P_{MOD}$ input to the input port SLa from the output port SLb is output as a signal pressure $P_{SL}$ substantially as is. That is, an output state of the signal pressure $P_{SL}$ is switched based on the signal from the control portion 1. The signal pressure $P_{SL}$ output from the output port SLb is input to an oil chamber 26a of the lock-up relay valve 26, which will be described later, via an oil path e1.

Although the solenoid valve SL is of so-called normal close type in which the input port SLa is disconnected from the output port SLb during non-energization, the solenoid valve SL may be of so-called normal open type in which the input port SLa communicates with the output port SLb during non-energization and, in this case, a signal pressure $P_{SL}$ is not output in the energization state.

The lock-up relay valve (switching valve) 26 includes a spool 26p and a spring 26s biasing the spool 26p upward the drawing and includes the oil chamber 26a, an input port 26b, a port 26c, an output port 26d, an input port 26e, a port 26f, a port 26g, and an discharge port 26h above the spool 26p.

The output port SLb of the solenoid valve SL described above is connected to the oil chamber 26a described above via the oil path e1 and, when the signal pressure $P_{SL}$ is output from the solenoid valve SL, the signal pressure $P_{SL}$ is input. That is, the lock-up relay valve 26 is present in the position (referred to below as the left-half position) indicated by the left half of the drawing in the state in which the signal pressure $P_{SL}$ is not output from the solenoid valve SL, and the lock-up relay valve 26 is present in the position (referred to below as the right-half position) indicated by the right half of the drawing in the state in which the signal pressure $P_{SL}$ is output from the solenoid valve SL. That is, the lock-up relay valve 26 is switched based on an input state of the signal pressure $P_{SL}$.

When the spool 26p of the lock-up relay valve 26 is present in the left-half position, the input port 26b communicates with the port 26c, the port 26g communicates with the output port 26d, and the input port 26e communicates with the port 26f. In addition, when the spool 26p is present in the right-half position, the port 26c communicates with the output port 26d, the input port 26e communicates with the port 26g, the port 26f communicates with the discharge port 26h, and the input port 26b is disconnected from the spool 26p.

For example, when the solenoid valve SL described above is put in the OFF state based on an instruction from the control portion 1, the hydraulic pressure is not input to the oil chamber 26a and the spool 26p is present in the left-half position based on the biasing force of the spring 26s. Then, the secondary pressure $P_{SEC}$ input to the input port 26e via the oil paths b2 and b3 is output from the port 26f, supplied to a port (L-UP/OFF port) 4e of the torque converter 4 via an oil path g1. That is, the secondary pressure $P_{SEC}$ is supplied to the inside of the torque converter 4 as a circulation hydraulic pressure for circulating the oil inside the torque converter 4. The oil supplied to the torque converter 4 is exhausted from a port (L-UP/ON port) 4d, input to the port 26g of the lock-up relay valve 26 described above via an oil path f1, output from the output port 26d, and input to the oil cooler (COOLER) 33 via an oil path h1. The oil input to the oil cooler 33 is exhausted to an oil pan (not illustrated) after being cooled by the oil cooler 33, and then sucked by the oil pump 21 again via the strainer 22.

In the state in which the secondary pressure $P_{SEC}$ is input from the port 4e of the torque converter 4 and exhausted from the port 4d as described above, a piston 7a of the lock-up clutch 7 is separated from a front cover 4f. That is, the lock-up clutch 7 is released and put in the off state. That is, in this state, the supply of a lock-up engagement pressure is turned off, in which the secondary pressure $P_{SEC}$ is supplied as the circulation hydraulic pressure of the torque converter 4 and not supplied as the lock-up engagement pressure.

In addition, in the state in which the lock-up relay valve 26 is present in the left-half position (that is, the lock-up clutch 7 is off), the secondary pressure $P_{SEC}$ input to the input port 26b via the oil paths b2, b4, and b6, an orifice 51, a check valve 43, and the oil path b7 is supplied to the lubrication oil path 34 via an oil path c3 and the oil path c2 from the port 26c. The check valve 43 between the oil path b6 and the oil path b7 is provided as a check valve for preventing the discharge pressure of the secondary pressure $P_{SEC}$ from flowing back to the oil path b6 via the oil paths c1, c3, and b7.

In contrast, when the solenoid valve SL described above is put in the ON state based on, for example, an instruction of the control portion 1, in the lock-up relay valve 26, the above signal pressure $P_{SL}$, described above is input to the oil chamber 26a and the spool 26p is present in the right-half position against the biasing force of the spring 26s. Then, the secondary pressure $P_{SEC}$ input to the input port 26e via the oil paths b2 and b3 is output from the port 26g, supplied to the port 4d of the torque converter 4 via the oil path f1. That is, the secondary pressure $P_{SEC}$ is supplied to the inside of the torque converter 4 as the lock-up engagement pressure. In addition, the port 4e of the torque converter 4 communicates with the discharge port 26h via the oil path g1 and the port 26f. That is, the secondary pressure $P_{SEC}$ is exhausted from the port 4e. When the secondary pressure $P_{SEC}$ is exhausted from the port 4e as described above, the hydraulic pressure in the space between the piston 7a of the lock-up clutch 7 and the front cover 4f is reduced and the piston 7a is pushed and driven toward the front cover 4f based on the differential pressure with respect to the secondary pressure $P_{SEC}$ in the torque converter 4. That is, the lock-up clutch 7 is engaged and put in the on state. That is, in this state, the secondary pressure $P_{SEC}$ is supplied to the torque converter 4 as the lock-up engagement pressure and the supply of the lock-up engagement pressure is turned on.

Although the on-off control of the lock-up clutch 7 is performed as an example in the embodiment, the slip control of the lock-up clutch 7 can be performed by providing, for example, a lock-up control valve for controlling the exhaust of the secondary pressure $P_{SEC}$ in the discharge port 26h and adjusting the secondary pressure $P_{SEC}$ exhausted via the control valve using a linear solenoid valve SLU or the like. At this time, the linear solenoid valve SlX can be used in place of the solenoid valve SL. That is, one linear solenoid valve SLU may be used to perform the on-off slip control of the lock-up clutch 7.

When the lock-up relay valve 26 is switched to the right-half position so that the lock-up clutch 7 described above is turned on, the input port 26b is disconnected from the port 26c. That is, communication between the oil path b7 and the oil path c3 is interrupted. This prevents the secondary pressure $P_{SEC}$ from flowing to the lubrication oil path 34 from the oil path. That is, as in the hydraulic pressure control device having no oil path passing through the orifice 51, the secondary pressure $P_{SEC}$ immediately increases and the feedback pressure of the secondary pressure $P_{SEC}$ immediately falls in the normal adjustment area (secondary crack) against the biasing force of the spring 25s.

When the lock-up relay valve 26 is switched to the right-half position so that the lock-up clutch 7 described above is turned on, the discharge pressure of the secondary pressure $P_{SEC}$ is input to the port 26c via the oil paths c1 and c3 and supplied from the output port 26d to the oil cooler 33 via the oil path h1.

Figure 3:
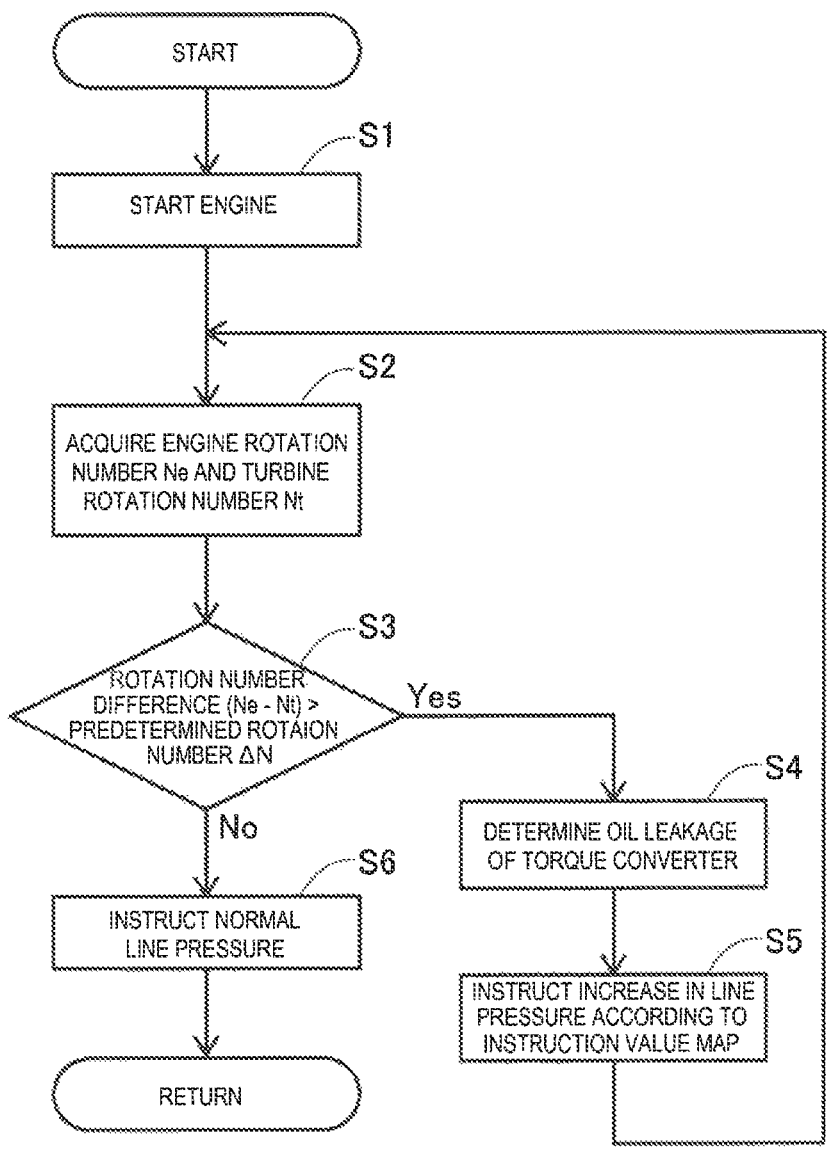
FIG. 3 is a flowchart illustrating control by a control portion of the automatic transmission.

Next, control by the control portion 1 of the automatic transmission 3 will be described based on FIGS. 3 to 5 with reference to FIG. 1. As illustrated in FIG. 3, when a start switch (READY switch) disposed, for example, near the driver's seat of a vehicle is pressed, the system of the control portion 1 is started and the control by the control portion 1 is started. The line pressure increase control (circulation hydraulic pressure increase control) by the control portion 1 described below is performed when the vehicle stops (the vehicle speed is 0) after the engine 2 is started. However, if for example, the line pressure increase control is started immediately after the driver starts the engine 2, the line pressure increase control may be performed even when an attempt is made to start the vehicle by switching the shift range to the D (drive) range. In particular, at the start of the vehicle, until the transmission shift stage (for example, the forward first stage) at the start changes to the next transmission shift stage (that is, until the transmission shift ratio at the start changes) in the automatic transmission 3, the line pressure increase control can be performed according to the instruction value map 13, which will be described later.

Next, when the engine 2 is started by the depression of the start switch described above (S1), the engine rotational speed acquiring device 14 first obtains the engine rotation number Ne by receiving an engine rotational speed signal from the engine 2 (engine control portion) and the turbine rotational speed acquiring device 15 acquires the turbine rotation number Nt by receiving a turbine rotational speed signal from the turbine rotational speed sensor 82. (S2). Although the engine rotational speed signal is received from the engine 2 in the embodiment, for example, a sensor for detecting the rotational speed of the input shaft (not illustrated) of the automatic transmission 3 or the pump impeller 4a may be provided to acquire the engine rotation number Ne from the sensor.

Figure 5A:
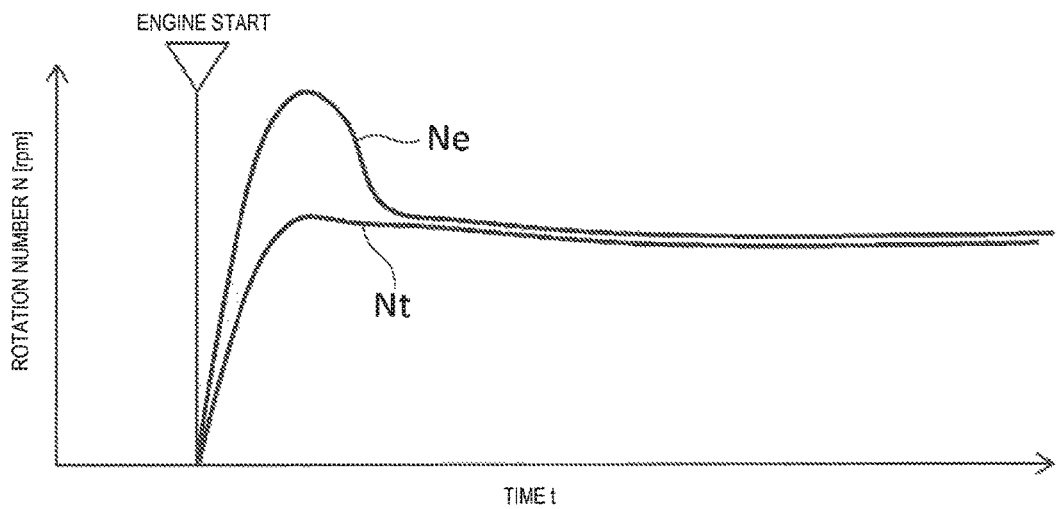
FIG. 5A is a time chart illustrating the relationship between an engine rotation number and a turbine rotation number during start of an engine when a torque converter is filled with oil.

Next, the oil shortage determination device 12 calculates a rotation number difference (rotational speed difference) (Ne−Nt) between the acquired engine rotation number Ne and the acquired turbine rotation number Nt and determines whether the rotation number difference is larger than a predetermined rotation number (predetermined rotational speed) $\Delta N$ (S3). When the torque converter 4 is filled with oil, the rotation of the engine 2 is fluid-transmitted to the turbine runner 4b via the pump impeller 4a when the engine 2 is started as illustrated in FIG. 5A and the turbine rotation number Nt immediately increases in response to an increase in the engine rotation number Ne. At this time, in the engine 2, the rotating force by ignition is added to the rotating force by a starter and a rotation number of the engine 2 temporarily increases to more than an idling rotation number, but the rotation number is stabilized to the idling rotation number soon. Then, the turbine rotation number Nt is stabilized to a rotation number slightly less than the engine rotation number Ne, which is the idling rotation number, by the dragging resistance of the automatic transmission mechanism 5 or the like.

Accordingly, if the predetermined rotation number $\Delta N$ is set to a rotation number including a certain margin (for example, approximately 500 [rpm]), when the rotation number difference (Ne−Nt) between the engine rotation number Ne and the turbine rotation number Nt does not exceed the predetermined rotation number $\Delta N$ and the rotation number difference (Ne−Nt) is equal to or less than the predetermined rotation number $\Delta N$ (No in S3), the oil shortage determination device 12 does not determine the oil leakage of the torque converter 4. Therefore, according to the instruction value map 13 illustrated in FIG. 4, the line pressure control device 11 instructs the hydraulic pressure instruction value determined based on the input torque, as described above, to the linear solenoid valve SLT (S6) so as to obtain the normal line pressure $P_L$, and repeats (returns) this control.

Specifically, as illustrated in the instruction value map 13 in FIG. 4, when the difference of the turbine rotation number Nt from the engine rotation number Ne is less than the predetermined rotation number $\Delta N$, regardless of the engine rotation number Ne, the line pressure control device 11 selects A [pa] as the hydraulic pressure instruction value, and instructs the linear solenoid valve SLT so that the line pressure $P_L$ equals A[pa] as the value of the minimum line pressure $P_L$, necessary for the hydraulic pressure control device 6 when the engine 2 is idle. Since the driving load of the oil pump 21 is suppressed to the minimum and the driving load on the engine 2 is suppressed to the minimum by suppressing the line pressure $P_L$ to the minimum, the fuel economy of the vehicle can be improved.

In the state in which control is made so as to obtain the normal line pressure $P_L$ as described above, the discharge pressure of the line pressure $P_L$ is supplied from the discharge pressure output port 24c of the primary regulator valve 24 to the pressure adjustment port 25d of the secondary regulator valve 25, the secondary pressure Psec is adjusted by the secondary regulator valve 25 depending on the SLT pressure $P_{SLT}$, and the adjusted pressure becomes the normal circulation hydraulic pressure (the first circulation hydraulic pressure) to be supplied to the torque converter 4. This normal circulation hydraulic pressure is designed so as to enable the power transmission of the torque converter 4.

Figure 5B:
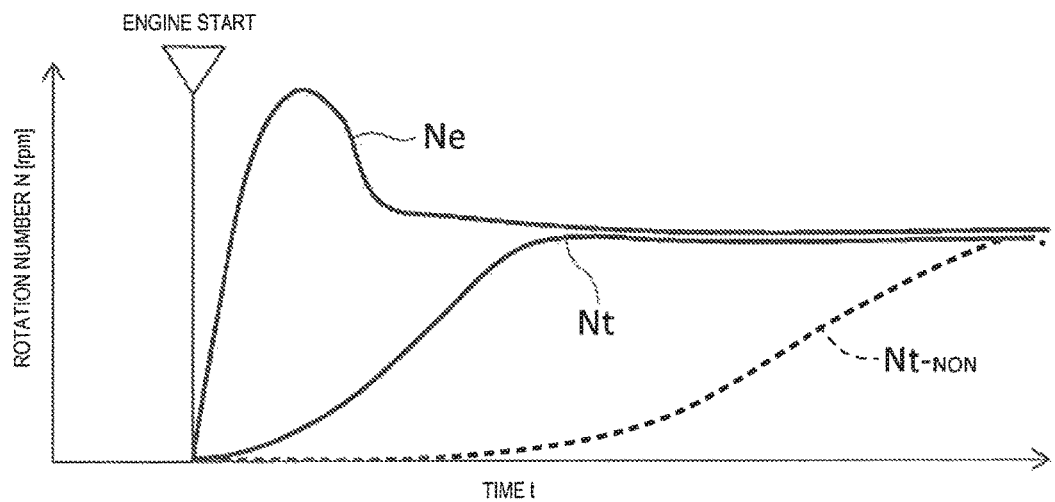
FIG. 5B is a time chart illustrating the relationship between the engine rotation number and the turbine rotation number during start of the engine when oil has leaked from the torque converter.

In contrast, when the oil in the torque converter 4 has leaked, even if the engine 2 is started and the engine rotation number Ne increases, the rotation of the engine 2 is not fluid-transmitted (not easily fluid-transmitted depending on the amount of the oil) from the pump impeller 4a to the turbine runner 4h, as illustrated in FIG. 5B. Accordingly, only the pump impeller 4a idly rotates, even though, for example, friction engagement elements of the automatic transmission mechanism 5 are in the neutral state (not engaged) or even though, for example, travel is enabled because the foot brake is turned off in the D (drive) range, the turbine rotation number Nt does not increase because it does not respond to an increase in the engine rotation number Ne. Accordingly, when the rotation number difference (Ne−Nt) between the engine rotation number Ne and the turbine rotation number Nt exceeds the predetermined rotation number ΔN (Yes in S3), the oil shortage determination device 12 determines the oil leakage of the torque converter 4 (S4). Accordingly, the line pressure control device 11 starts the line pressure increase control and instructs a hydraulic pressure instruction value to the linear solenoid valve SLT so as to make the line pressure $P_L$ higher than usual according to the instruction value map 13 illustrated in FIG. 4 (S5). At this time, the solenoid valve SL described above undergoes off-control, the lock-up relay valve 26 is present in the left-half position, and the secondary pressure $P_{SEC}$ is supplied as the circulation hydraulic pressure (not supplied as the lock-up engagement pressure).

Specifically, as illustrated in the instruction value map 13 in FIG. 4, when the engine rotation number Ne is, for example, 1100 [rpm] and the turbine rotation number Nt is 200 [rpm], the line pressure control device 11 selects a hydraulic pressure instruction value larger than the normal hydraulic pressure instruction value A [pa] by 600 [pa]. When the engine rotation number Ne is, for example, 2100 [rpm] and the turbine rotation number Nt is 200 [rpm], the line pressure control device 11 selects a hydraulic pressure instruction value larger than the normal hydraulic pressure instruction value A [pa] by 850 [pa]. When the engine rotation number Ne is, for example, 2100 [rpm] and the turbine rotation number Nt is 1100 [rpm], the line pressure control device 11 selects a hydraulic pressure instruction value larger than the normal hydraulic pressure instruction value A [pa] by 550 [pa].

That is, the line pressure control device 11 instructs the linear solenoid valve SLT so as to increase the line pressure $P_L$ more greatly as the rotation number difference (Nt−Ne) of the engine rotation number Ne with respect to the turbine rotation number Nt increases toward the horizontal direction of the instruction value map 13 illustrated in FIG. 4. In addition, the line pressure control device 11 instructs the linear solenoid valve SLT so as to increase the line pressure $P_L$ less greatly as the rotation number difference (Nt−Ne) of the turbine rotation number Nt with respect to the engine rotation number Ne increases toward the vertical direction of the instruction value map 13 illustrated in FIG. 4.

Since the water temperature or the like of the engine 2 is low when the engine 2 is stopped for a long period of time, an engine control portion (not illustrated) controls the idling rotation number for warming up the engine 2 to reach approximately 2100 [rpm] that is larger than a normal idling rotation number (600 to 700 [rpm]). This rotates the oil pump 21 higher than the normal speed, so the hydraulic pressure to be generated becomes larger.

In the structure (see FIG. 2) of the hydraulic pressure control device 6 described above, the secondary regulator valve 25 also adjusts the secondary pressure $P_{SEC}$ depending on the hydraulic pressure of the linear solenoid valve SLT. That is, when the SLT pressure $P_{SLT}$ of the linear solenoid valve SLT increases so as to increase the line pressure $P_L$, the secondary pressure $P_{SEC}$ that becomes the circulation hydraulic pressure of the torque converter 4 also increases.

Accordingly, the amount of oil supplied to the torque converter 4 becomes larger due to the secondary pressure $P_{SEC}$ (second circulation hydraulic pressure) higher than the normal secondary pressure Psec (first circulation hydraulic pressure) described above when control for the normal line pressure $P_L$ is made, so the torque converter 4 is filled with oil more early. Therefore, as illustrated in FIG. 5B, the turbine rotation number Nt increases more early than a turbine rotation number $Nt_{NON}$ obtained when the line pressure $P_L$ (secondary pressure $P_{SEC}$) does not increase, so the torque converter 4 starts the fluid transmission more early.

Since the rotation number difference (Ne−Nt) between the engine rotation number Ne and the turbine rotation numbers Nt falls within the predetermined rotation number ΔN when the fluid transmission of the torque converter 4 starts as described above (No in S3), the control of the line pressure $P_L$ is returned to the normal control from the line pressure increase control in step S5 (S6).

Since the torque converter 4 is filled with oil quickly as described above, even when, for example, the driver makes an attempt to start the vehicle by switching the shift range from the parking range to the drive range immediately after the engine 2 starts, the driver can travel the vehicle without a feeling of strangeness because the torque converter 4 immediately recovers the transmission of a driving force. Since the lock-up clutch 7 is not engaged at this time, the durability of the lock-up clutch 7 is not affected at all.

In addition, when the instruction value of the line pressure $P_L$ is selected along the horizontal direction of the instruction value map 13 illustrated in FIG. 4, if the turbine rotation number Nt is substantially constant even though, for example, the driver increases the engine rotation number Ne by depressing the accelerator, the line pressure $P_L$ increases. When the instruction value of the line pressure $P_L$ is selected along the vertical direction of the instruction value map 13 illustrated in FIG. 4, if, for example, the turbine rotation number Nt approaches the engine rotation number Ne (the rotation number difference becomes smaller) after the line pressure $P_L$ increases while the turbine rotation number Nt is kept substantially constant, oil is being accumulated in the torque converter 4. Accordingly, the line pressure $P_L$ is reduced and gradually approaches the control for obtaining the normal line pressure $P_L$.

Since fluid transmission starts when the torque converter 4 is filled with a certain amount of oil even if it is not completely filled, the lost phenomenon of a driving force becomes small enough for the driver to annoy, consequently preventing the lost phenomenon from occurring when the engine 2 starts after stopping for a long period of time. Needless to say, if the hydraulic pressure instruction value used to increase the line pressure $P_L$ (secondary pressure $P_{SEC}$) is higher, the torque converter 4 is filled with oil more early. Therefore, the hydraulic pressure instruction value used to increase the line pressure $P_L$ (secondary pressure $P_{SEC}$) only needs to be set to an appropriate value to prevent the driver from having a feeling of strangeness. The hydraulic pressure instruction value is preferably set to the maximum allowable value in consideration of the capacity of the torque converter 4, the amount of oil leaking from the leaking portion, the discharge capability of the oil pump, and the like.

In addition, since the line pressure $P_L$, (secondary pressure $P_{SEC}$) increases when the engine 2 starts after the engine 2 stopped for a long period of time, even if the lubricant supplied to various types of gears or bearings in the automatic transmission mechanism 5 drops downward, the lubrication pressure (discharge pressure of the secondary pressure) to be supplied to the lubrication oil path 34 of the automatic transmission mechanism 5 also increases and the amount of lubricant of the automatic transmission mechanism 5 increases, possibly having effects of protecting and improving the durability of the automatic transmission mechanism 5.

As described above, the automatic transmission (3) (see, for example, FIGS. 1 to 5) includes
a fluid transmission device (4) fluid-transmitting rotation of a driving source (2) via oil filled therein,
a transmission mechanism (5) changing an output rotational speed from the fluid transmission device (4) and outputting the changed rotational speed,
a hydraulic pressure control device (6) including a circulation hydraulic pressure adjustment valve (25) adjusting a hydraulic pressure discharged by an oil pump (21) to a circulation hydraulic pressure ($P_{SEC}$) circulating through the fluid transmission device (4) and an adjustment solenoid valve (SLT) supplying a signal pressure to the circulation hydraulic pressure adjustment valve (25), and
a control portion (1) including a driving source rotation acquiring portion (14) acquiring a rotational speed (Ne) of the driving source (2) and a fluid transmission device rotation acquiring portion (15) acquiring an output rotational speed (Nt) of the fluid transmission device (4),
in which the control portion (1) controls the adjustment solenoid valve (SLT) so that the circulation hydraulic pressure ($P_{SEC}$) equals to a first circulation hydraulic pressure when a rotational speed difference (Ne–Nt) between the output rotational speed (Nt) of the fluid transmission device (4) and the rotational speed (Ne) of the driving source (2) is equal to or less than a predetermined rotational speed ($\Delta N$) and the control portion controls the adjustment solenoid valve (SLT) so that the circulation hydraulic pressure ($P_{SEC}$) equals to a second circulation hydraulic pressure higher than the first circulation hydraulic pressure when the rotational speed difference (Ne–Nt) between the output rotational speed (Nt) of the fluid transmission device (4) and the rotational speed (Ne) of the driving source (2) is more than the predetermined rotational speed ($\Delta N$).

Accordingly, since the torque converter 4 can be quickly filled with oil by increasing the secondary pressure $P_{SEC}$ when the oil in the torque converter 4 has leaked, it is possible to prevent the lost phenomenon of a driving force from occurring when the engine 2 starts after stopping for a long period of time without using a mechanical structure for preventing oil leakage or without using the lock-up clutch 7.

In the technique disclosed in JP-A-2014-202218, when the lock-up engagement pressure is supplied to engage the lock-up clutch, the torque converter is filled with oil by supplying the lock-up engagement pressure. However, when the lock-up clutch is engaged with and makes close contact with a front cover or the like, the escaping path for the air stored in the torque converter is blocked, thereby reducing the speed at which the torque converter is filled with oil by supplying the lock-up engagement pressure. Accordingly, in the method according to the embodiment in which the torque converter 4 is filled with oil by increasing the line pressure $P_L$ and the secondary pressure $P_{SEC}$, the speed at which the torque converter is filled with oil increases.

In addition, in the automatic transmission (3) (see, for example, FIGS. 1 to 5), the control portion (1) snakes the second circulation hydraulic pressure closer to the first circulation hydraulic pressure as the output rotational speed (Nt) of the fluid transmission device (4) becomes closer to the rotational speed (Ne) of the driving source (2).

Accordingly, after, for example, the engine rotation number Ne increases in the state in which the turbine rotation number Nt does not increase while being kept substantially constant and the line pressure $P_L$ increases, when the turbine rotation number Nt approaches the engine rotation number Ne (when the rotation number difference becomes small), the torque converter 4 is being filled with oil, the line pressure $P_L$ is reduced, and control for the normal line pressure $P_L$ is approached.

In addition, the automatic transmission (3) (see, for example, FIGS. 1 to 5), includes
a fluid transmission device (4) fluid-transmitting rotation of a driving source (2) via oil filled therein;
a transmission mechanism (5) changing an output rotational speed from the fluid transmission device (4) and outputting a changed rotational speed;
a hydraulic pressure control device (6) including a circulation hydraulic pressure adjustment valve (25) adjusting a hydraulic pressure discharged by an oil pump (21) to a circulation hydraulic pressure $P_{SEC}$ circulating through the fluid transmission device (4) and an adjustment solenoid valve (SLT) supplying a signal pressure to the circulation hydraulic pressure adjust valve (25); and
the control portion (1) controlling the adjustment solenoid valve (SLT) so that the circulation hydraulic pressure ($P_{SEC}$) equals to a first circulation hydraulic pressure when the fluid transmission device (4) is filled with oil and controlling the adjustment solenoid valve (SLT) so that the circulation hydraulic pressure ($P_{SEC}$) equals to a second circulation hydraulic pressure higher than the first circulation hydraulic pressure when the oil has leaked from the fluid transmission device (4).

Accordingly, since the torque converter 4 can be quickly filled with oil by increasing the secondary pressure $P_{SEC}$ when the oil in the torque converter 4 has been leaked, it is possible to prevent the lost phenomenon of a driving force from occurring without using a mechanical structure for preventing oil leakage when the engine 2 starts after stopping for a long period of time.

In addition, in the automatic transmission (3) (see, for example, FIGS. 1 to 5), the control portion (1) acquires the rotational speed (Ne) of the driving source (2), acquires the output rotational speed (Nt) of the fluid transmission device (4), and determines whether the oil has leaked from the fluid transmission device (4) based on a difference between the rotational speed (Ne) of the driving source (2) and the output rotational speed (Nt) of the fluid transmission device (4).

Accordingly, as compared with the case in which the oil leakage of the torque converter 4 is determined by measuring, for example, the time period in which the engine 2 is stopped, it is possible to accurately determine whether the oil in the torque converter 4 has leaked using simple control.

In addition, in the automatic transmission (3) (see, for example, FIGS. 1 to 5), the control portion (1) increases the second circulation hydraulic pressure more greatly than the first circulation hydraulic pressure as the rotational speed (Ne) of the driving source (2) becomes larger than the output rotational speed (Nt) of the fluid transmission device (4).

Further, in the automatic transmission (3) (see, for example, FIGS. 1 to 5), the control portion (1) makes the second circulation hydraulic pressure closer to the first circulation hydraulic pressure as the output rotational speed (Nt) of the fluid transmission device (4) becomes closer to the rotational speed (Ne) of the driving source (2).

In addition, in the automatic transmission (3) (see, for example, FIGS. 1 to 5), the control portion (1) determines that oil in the fluid transmission device (4) has leaked when a difference between the rotational speed (Ne) of the driving source (2) and the output rotational speed (Nt) of the fluid transmission device (4) is larger than a predetermined rotational speed (ΔN).

This can accurately determine the oil leakage of the torque converter 4 using simple control.

In addition, in the automatic transmission (3) (see, for example, FIGS. 1 to 5), the control portion (I) increases the circulation hydraulic pressure $P_{SEC}$ by instructing an instruction value to the adjustment solenoid valve (SLT) based on the rotational speed (Ne) of the driving source (2) and the output rotational speed (Nt) of the fluid transmission device (4) in accordance with an instruction value map (13) recording correspondence among the rotational speed (Ne) of the driving source (2), the output rotational speed (Nt) of the fluid transmission device (4), and an instruction value for instructing the adjustment solenoid valve (SLT).

This eliminates the need to always calculate the instruction value of the linear solenoid valve SLT, reduce calculation by the control portion 1, and simply achieves the control for increasing the instruction value.

In addition, in the automatic transmission (3) (see, for example, FIGS. 1 to 5), the hydraulic pressure control device (6) has a line pressure adjustment valve (24) adjusting a hydraulic pressure discharged by the oil pump (21) to a line pressure ($P_L$) in accordance with the signal pressure of the adjustment solenoid valve (SLT), the circulation hydraulic pressure adjustment valve (25) adjusts a discharge pressure of the line pressure ($P_L$) to the circulation hydraulic pressure ($P_{SEC}$), the control portion (1) makes the circulation hydraulic pressure ($P_{SEC}$) equal to the first circulation hydraulic pressure by controlling the adjustment solenoid valve (SLT) in accordance with an input torque calculated from a speed ratio (Ne/Nt) between the rotational speed (Ne) of the driving source (2) and the output rotational speed (Nt) of the fluid transmission device (4) and makes the circulation hydraulic pressure ($P_{SEC}$) equal to the second circulation hydraulic pressure by controlling the adjustment solenoid valve (SLT) so that the line pressure ($P_L$) increases.

This can increase the secondary pressure $P_{SEC}$ only using simple control that only calculates an instruction value for the line pressure $P_L$ to be given to the normal linear solenoid valve SLT without performing, for example, complicated calculation for raising the secondary pressure $P_{SEC}$ in the control portion 1.

In addition, in the automatic transmission (3) (see, for example, FIG. 1 to 5), the first circulation hydraulic pressure is a hydraulic pressure enabling power transmission of the fluid transmission device.

In addition, the automatic transmission (3) (see, for example, FIG. 1 to 5) is characterized in that the fluid transmission device (4) has a lock-up clutch (7) engaged when a lock-up engagement pressure is supplied, the hydraulic pressure control device (6) has a switching valve (26) for turning on or off supply of the lock-up engagement pressure, and the control portion (1) increases the circulation hydraulic pressure ($P_{SEC}$) by controlling the adjustment solenoid valve (SLT) when the supply of the lock-up engagement pressure is turned off by the switching valve (26).

Since this prevents the lock-up clutch 7 from being engaged in the state in which there is no oil or a little oil in the torque converter 4, thereby preventing the durability of the lock-up clutch 7 from being affected.

In addition, the automatic transmission (3) (see, for example, FIGS. 1 to 5) is characterized in that the control portion (1) starts control for making the circulation hydraulic pressure ($P_{SEC}$) equal to the second circulation hydraulic pressure immediately after the driving source (2) is started.

In the embodiment, the oil shortage determination device 12 of the control portion 1 determines whether the oil in the torque converter 4 has leaked and, when determining that the oil in the torque converter 4 has not leaked, the oil shortage determination device 12 controls the line pressure $P_L$ (secondary pressure $P_{SEC}$) based on the normal throttle opening. When determining that the oil in the torque converter 4 has leaked, the oil shortage determination device 12 controls the line pressure $P_L$ (secondary pressure $P_{SEC}$) to reach a higher value than in the normal control. Since the oil in the torque converter 4 has leaked when the turbine rotation number Nt does not increase in sync with the engine rotation number Ne even though the automatic transmission mechanism 5 is in the neutral state, the control portion 1 (oil shortage determination device 12) may not particularly determine whether the oil in the torque converter 4 has leaked and may make control so as to increase the line pressure $P_L$ (secondary pressure $P_{SEC}$) more greatly as the rotation number difference (Ne−Nt) between the engine rotation number Ne and the turbine rotation number Nt increases based on the line pressure $P_L$ in the normal control. In this case, since the instruction value map 13 is set so as to achieve the normal line pressure $P_L$ if the rotation number difference (Ne−Nt) between the engine rotation number Ne and the turbine rotation number Nt is the rotation number difference when the torque converter 4 is filled with oil, the hydraulic pressure is naturally stabilized at the normal line pressure $P_L$ if the torque converter 4 is filled with oil.

In addition, although the oil shortage determination device 12 of the control portion 1 determines the oil leakage of the torque converter 4 based on the rotation number difference (Ne−Nt) between the engine rotation number Ne and the turbine rotation number Nt in the embodiment, the disclosure is not limited to the embodiment and any other method may be used as long as oil leakage of the torque converter 4 can be determined. For example, since oil leakage of the torque converter 4 is proportional to the time (period) for which the engine 2 is stopped and how the oil leaked can be obtained through calculation or experiment based on the structure of the torque converter 4, counting device for counting the stop period of the engine 2 may be provided and, based on the counted stop period, oil leakage of the torque converter 4 may be determined. The counting device for counting the stop period of the engine 2 may be provided in the control portion 1 of the automatic transmission or another control portion (for example, an engine control portion), car navigation system, or the like, from which a signal reporting the stop period can be received to acquire the period.

In addition, although the oil shortage determination device 12 of the control portion 1 determines the oil leakage of the torque converter 4 based on the rotation number difference between the engine rotation number Ne and the turbine rotation number Nt in the embodiment, the oil leakage of the torque converter 4 may be determined when, for example, the rotation deviation between the engine rotation number Ne and the turbine rotation number Nt is larger than a predetermined deviation. That is, any method may be adopted as long as the oil leakage of the torque converter 4 may be determined by the difference between the engine rotation number Ne and the turbine rotation number Nt.

In addition, although the automatic transmission has been described for the vehicle that only has the engine 2 in the embodiment, for example, a hybrid vehicle is allowed in which an engine and a motor generator are included as driving sources and the driving forces of the driving sources are transmitted by a torque converter. Even if the engine does not start immediately and an EV travel mode is entered when a vehicle start switch of the hybrid vehicle is depressed, the torque converter can be filled with oil more quickly by increasing the line pressure based on a hydraulic pressure generated by an electric oil pump or the like.

In addition, although an increase in the line pressure $P_L$ is controlled according to the instruction value map 13 in the embodiment, the instruction value may be corrected depending on, for example, the oil temperature without using the value of the instruction value map as is or may be corrected to a larger value particularly when the oil temperature is low and the viscosity of the oil is high. In addition, the instruction value of the line pressure may be calculated as appropriate without having the instruction value map. Similarly in this case, the instruction value may be calculated in consideration of the oil temperature or the like.

In addition, although no instructions are provided for the engine 2 in the embodiment, the discharging hydraulic pressure of the oil pump 21 may be increased by outputting an instruction for increasing the idling rotation number to the engine 2 to cause the torque converter 4 to be filled with oil more early.

In addition, although the fluid transmission device is a torque converter in the embodiment, the fluid transmission device may be any type of fluid transmission device fluid-transferring a driving force, such as, for example, a fluid coupling.

INDUSTRIAL APPLICABILITY

The automatic transmission may be used as an automatic transmission mounted in a vehicle such as an automobile or a truck and preferably used as an automatic transmission for which occurrence of the lost phenomenon of a driving force needs to be prevented when the engine starts after stopping for a long period of time.

The invention claimed is:

1. An automatic transmission comprising:
a fluid transmission device fluid-transmitting rotation of a driving source via oil filled therein;
a transmission mechanism changing an output rotational speed from the fluid transmission device and outputting a changed rotational speed;
a hydraulic pressure control device including a circulation hydraulic pressure adjustment valve adjusting a hydraulic pressure discharged by an oil pump to a circulation hydraulic pressure circulating through the fluid transmission device and an adjustment solenoid valve supplying a signal pressure to the circulation hydraulic pressure adjustment valve; and
a control portion that acquires a rotational speed of the driving source and that acquires an output rotational speed of the fluid transmission device, wherein:
the control portion controls the adjustment solenoid valve so that the circulation hydraulic pressure equals to a first circulation hydraulic pressure when a rotational speed difference between the output rotational speed of the fluid transmission device and the rotational speed of the driving source is equal to or less than a predetermined rotational speed and
the control portion controls the adjustment solenoid valve so that the circulation hydraulic pressure equals to a second circulation hydraulic pressure higher than the first circulation hydraulic pressure when the rotational speed difference between the output rotational speed of the fluid transmission device and the rotational speed of the driving source is more than the predetermined rotational speed.

2. The automatic transmission according to claim 1, wherein the control portion makes the second circulation hydraulic pressure closer to the first circulation hydraulic pressure as the output rotational speed of the fluid transmission device becomes closer to the rotational speed of the driving source.

3. The automatic transmission according to claim 2, wherein the control portion increases the circulation hydraulic pressure by instructing an instruction value to the adjustment solenoid valve based on the rotational speed of the driving source and the output rotational speed of the fluid transmission device in accordance with an instruction value map recording correspondence among the rotational speed of the driving source, the output rotational speed of the fluid transmission device, and the instruction value for instructing the adjustment solenoid valve.

4. The automatic transmission according to claim 3, wherein:
the hydraulic pressure control device has a line pressure adjustment valve adjusting a hydraulic pressure discharged by the oil pump to a line pressure in accordance with the signal pressure of the adjustment solenoid valve,
the circulation hydraulic pressure adjustment valve adjusts a discharge pressure of the line pressure to the circulation hydraulic pressure,
the control portion makes the circulation hydraulic pressure equal to the first circulation hydraulic pressure by controlling the adjustment solenoid valve in accordance with an input torque calculated from a speed ratio between the rotational speed of the driving source and the output rotational speed of the fluid transmission device and makes the circulation hydraulic pressure equal to the second circulation hydraulic pressure by controlling the adjustment solenoid valve so as to increase the line pressure.

5. The automatic transmission according to claim 4, wherein the first circulation hydraulic pressure is a hydraulic pressure enabling power transmission of the fluid transmission device.

6. The automatic transmission according to claim 5, wherein:
the fluid transmission device has a lock-up clutch engaged when a lock-up engagement pressure is supplied,
the hydraulic pressure control device has a switching valve for turning on or off supply of the lock-up engagement pressure, and
the control portion increases the circulation hydraulic pressure by controlling the adjustment solenoid valve when the supply of the lock-up engagement pressure is turned off by the switching valve.

7. The automatic transmission according to claim 6, wherein the control portion starts control for making the circulation hydraulic pressure equal to the second circulation hydraulic pressure immediately after the driving source is started.

8. An automatic transmission comprising:
a fluid transmission device fluid-transmitting rotation of a driving source via oil filled therein;
a transmission mechanism changing an output rotational speed from the fluid transmission device and outputting a changed rotational speed;
a hydraulic pressure control device including a circulation hydraulic pressure adjustment valve adjusting a hydraulic pressure discharged by an oil pump to a circulation hydraulic pressure circulating through the fluid transmission device and an adjustment solenoid valve supplying a signal pressure to the circulation hydraulic pressure adjustment valve; and
a control portion controlling the adjustment solenoid valve so that the circulation hydraulic pressure equals to a first circulation hydraulic pressure when the fluid transmission device is filled with oil and controlling the adjustment solenoid valve so that the circulation hydraulic pressure equals to a second circulation hydraulic pressure higher than the first circulation hydraulic pressure when the oil has leaked from the fluid transmission device.

9. The automatic transmission according to claim 8, wherein the control portion acquires a rotational speed of the driving source, acquires an output rotational speed of the fluid transmission device, and determines whether the oil has leaked from the fluid transmission device based on a difference between the rotational speed of the driving source and the output rotational speed of the fluid transmission device.

10. The automatic transmission according to claim 9, wherein the control portion increases the second circulation hydraulic pressure more greatly than the first circulation hydraulic pressure as the rotational speed of the driving source becomes larger than the output rotational speed of the fluid transmission device.

11. The automatic transmission according to claim 10, wherein the control portion makes the second circulation hydraulic pressure closer to the first circulation hydraulic pressure as the output rotational speed of the fluid transmission device becomes closer to the rotational speed of the driving source.

12. The automatic transmission according to claim 11, wherein the control portion determines that oil in the fluid transmission device has leaked when a difference between the rotational speed of the driving source and the output rotational speed of the fluid transmission device is larger than a predetermined rotational speed.

13. The automatic transmission according to claim 12, wherein the control portion increases the circulation hydraulic pressure by instructing an instruction value to the adjustment solenoid valve based on the rotational speed of the driving source and the output rotational speed of the fluid transmission device in accordance with an instruction value map recording correspondence among the rotational speed of the driving source, the output rotational speed of the fluid transmission device, and the instruction value for instructing the adjustment solenoid valve.

14. The automatic transmission according to claim 13, wherein:
the hydraulic pressure control device has a line pressure adjustment valve adjusting a hydraulic pressure discharged by the oil pump to a line pressure in accordance with the signal pressure of the adjustment solenoid valve,
the circulation hydraulic pressure adjustment valve adjusts a discharge pressure of the line pressure to the circulation hydraulic pressure,
the control portion makes the circulation hydraulic pressure equal to the first circulation hydraulic pressure by controlling the adjustment solenoid valve in accordance with an input torque calculated from a speed ratio between the rotational speed of the driving source and the output rotational speed of the fluid transmission device and makes the circulation hydraulic pressure equal to the second circulation hydraulic pressure by controlling the adjustment solenoid valve so as to increase the line pressure.

15. The automatic transmission according to claim 14, wherein the first circulation hydraulic pressure is a hydraulic pressure enabling power transmission of the fluid transmission device.

16. The automatic transmission according to claim 15, wherein:
the fluid transmission device has a lock-up clutch engaged when a lock-up engagement pressure is supplied,
the hydraulic pressure control device has a switching valve for turning on or off supply of the lock-up engagement pressure, and
the control portion increases the circulation hydraulic pressure by controlling the adjustment solenoid valve when the supply of the lock-up engagement pressure is turned off by the switching valve.

17. The automatic transmission according to claim 16, wherein the control portion starts control for making the circulation hydraulic pressure equal to the second circulation hydraulic pressure immediately after the driving source is started.

* * * * *